United States Patent
Nishitani et al.

(10) Patent No.: US 12,093,851 B2
(45) Date of Patent: Sep. 17, 2024

(54) MATCHING SYSTEM AND MATCHING METHOD

(71) Applicant: TOYOTA JIDOSHA KABUSHIKI KAISHA, Toyota (JP)

(72) Inventors: Toru Nishitani, Nisshin (JP); Rio Suda, Numazu (JP); Hiroshi Yonenaga, Shinagawa-ku (JP); Hidekazu Sasaki, Yokohama (JP); Tatsushi Takenaka, Toyota (JP); Shun Ota, Susono (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 17/805,772

(22) Filed: Jun. 7, 2022

(65) Prior Publication Data
US 2023/0014472 A1 Jan. 19, 2023

(30) Foreign Application Priority Data
Jul. 13, 2021 (JP) .................................. 2021-115721

(51) Int. Cl.
*G06Q 10/02* (2012.01)
*B60W 50/14* (2020.01)
(Continued)

(52) U.S. Cl.
CPC ............. *G06Q 10/02* (2013.01); *B60W 50/14* (2013.01); *B60W 60/001* (2020.02);
(Continued)

(58) Field of Classification Search
CPC .... G06Q 10/02; G06Q 50/40; G06Q 20/0855; B60W 60/001; B60W 50/14;
(Continued)

(56) References Cited

U.S. PATENT DOCUMENTS

2014/0222252 A1* 8/2014 Matters ................ G05D 1/0016
701/2

FOREIGN PATENT DOCUMENTS

JP 2004295360 A * 10/2004

OTHER PUBLICATIONS

Machine Translation of JP2004295360A (Year: 2004).*

* cited by examiner

*Primary Examiner* — Andrew J Cromer
(74) *Attorney, Agent, or Firm* — Finnegan, Henderson, Farabow, Garrett and Dunner, LLP

(57) ABSTRACT

A matching system that matches a first vehicle requiring substitution when being at least either loaded into or unloaded from a parking place and a remote driver driving the first vehicle as a substitute through remote operation includes a terminal and a server. The terminal transmits substitution request information to the server. The server that has received the request information transmits waiting time information to the terminal. The terminal notifies a user or a staff of the received waiting time information, accepts a waiting time information approval or additional fee payment instructions, and settles the additional fee through cooperation with the server, upon receiving the payment instructions. The server changes the turn of the first vehicle in a queue for the remote operation service such that the first vehicle is prioritized more than a second vehicle that has not paid the additional fee, upon completing the additional fee settlement.

8 Claims, 6 Drawing Sheets

(51) Int. Cl.
   *B60W 60/00*    (2020.01)
   *G05D 1/00*     (2024.01)
   *G06Q 20/08*    (2012.01)
   *G06Q 50/40*    (2024.01)
   *H04L 67/12*    (2022.01)

(52) U.S. Cl.
   CPC ....... *G05D 1/0022* (2013.01); *G06Q 20/0855* (2013.01); *G06Q 50/40* (2024.01); *B60W 2050/146* (2013.01); *B60W 2556/45* (2020.02); *H04L 67/12* (2013.01)

(58) Field of Classification Search
   CPC ........ B60W 2556/45; B60W 2050/146; G05D 1/0022; H04L 67/12
   See application file for complete search history.

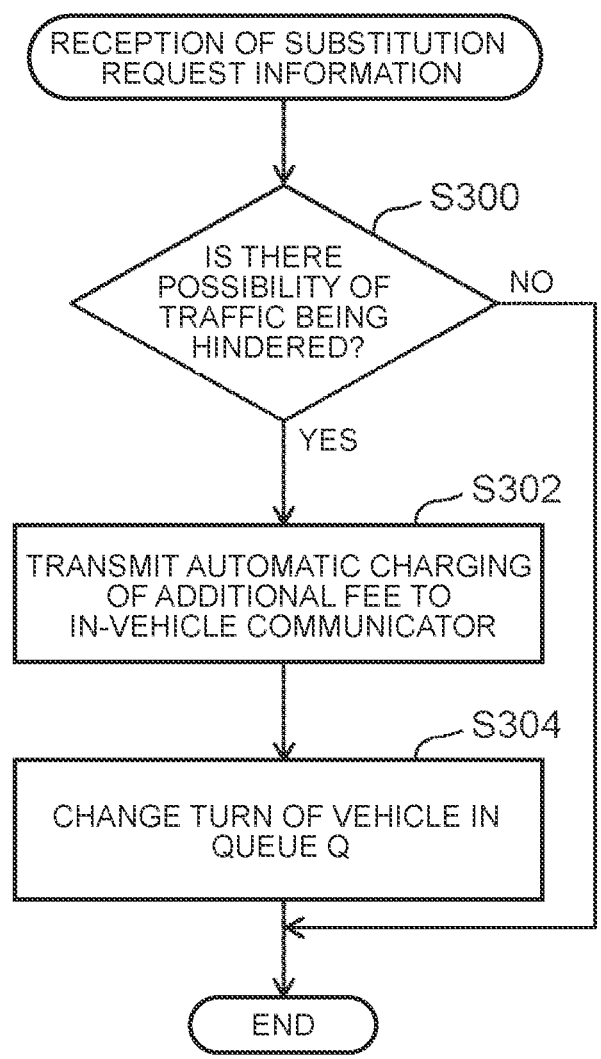

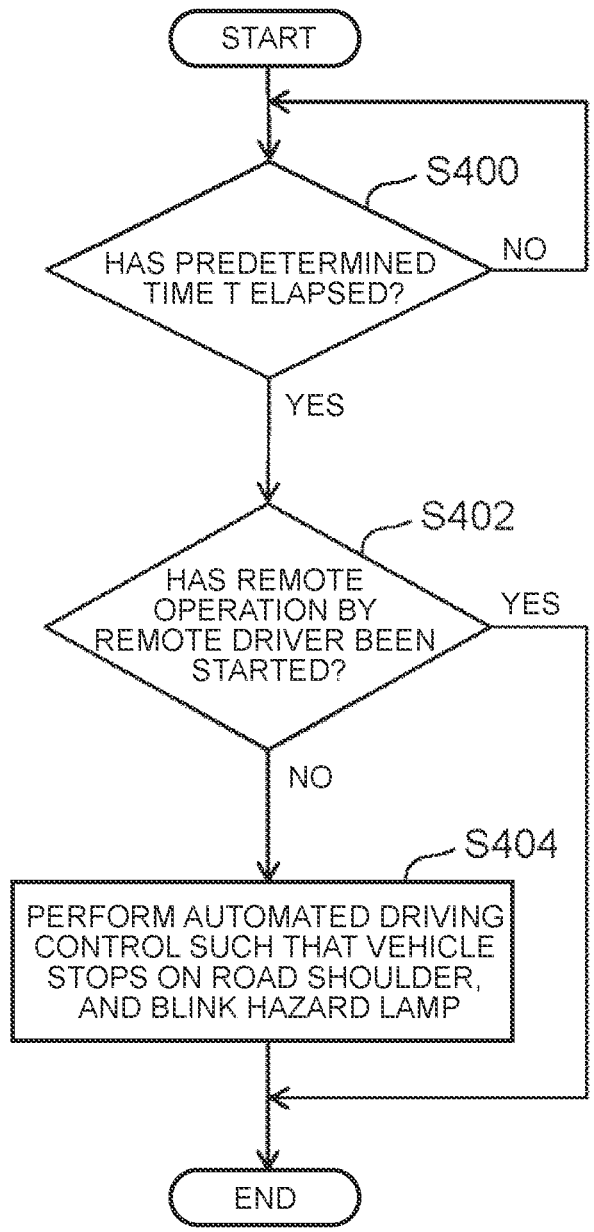

MATCHING SYSTEM AND MATCHING METHOD

CROSS-REFERENCE TO RELATED APPLICATION

This application claims priority to Japanese Patent Application No. 2021-115721 filed on Jul. 13, 2021, incorporated herein by reference in its entirety.

BACKGROUND

1. Technical Field

The present disclosure relates to a matching system and a matching method for performing a matching between a vehicle that requires substitution when being at least either loaded into or unloaded from a parking place and a remote driver who drives the vehicle as a substitute through remote operation.

2. Description of Related Art

In Japanese Unexamined Patent Application Publication No. 2004-295360 (JP 2004-295360 A), there is disclosed a vehicle remote driving device that can drive a vehicle through remote operation.

SUMMARY

In order to use remote driving in a valet parking service, it is necessary to perform a matching between a vehicle and a remote driver. It should be noted herein that the convenience of the service deteriorates if it takes a long time to match the vehicle and the remote driver with each other in loading or unloading the vehicle.

The present disclosure has been made in view of the problem as described above. It is an object of the present disclosure to shorten the time needed to match a vehicle and a remote driver with each other, and enhance the convenience of a valet parking service.

A matching system according to the present disclosure performs a matching between a first vehicle that requires substitution when being at least either loaded into or unloaded from a parking place and a remote driver who drives the first vehicle as a substitute through remote operation. The matching system is equipped with a terminal and a server. The terminal is operated by a user of the first vehicle or a staff of a facility that offers the parking place to the user. The server is connected to the terminal via a wireless communication network. The terminal transmits request information on substitution to the server. The server that has received the request information transmits, to the terminal, waiting time information indicating a waiting time until a timing when the first vehicle receives a remote operation service provided by the remote driver. The terminal notifies the user or the staff of the received waiting time information, and accepts approval of the waiting time information or payment instructions to pay an additional fee by the user or the staff. The terminal makes a settlement of the additional fee through cooperation with the server, upon receiving the payment instructions. The server changes a turn of the first vehicle in a queue for the remote operation service such that the first vehicle is given higher priority than a second vehicle that has not paid the additional fee, upon completing the settlement of the additional fee.

The server may transmit automatic charging of the additional fee to the terminal, and change the turn of the first vehicle in the queue such that the first vehicle is given higher priority than the second vehicle that has not paid the additional fee, when there is a possibility of a traffic being hindered by the first vehicle that stands by for the matching.

The server may transmit, to the terminal, corrected waiting time information indicating the waiting time that has been shortened as a result of payment of the additional fee, upon completing the settlement of the additional fee.

The first vehicle may be an automated driving vehicle including an electronic control unit that performs automated driving control. Moreover, the electronic control unit may perform automated driving control such that the first vehicle stops on a road shoulder, when remote operation of the first vehicle by the remote driver is not started even after the lapse of a predetermined time from transmission of the request information by the terminal.

A matching method according to the present disclosure is designed to perform a matching between a first vehicle that requires substitution when being at least either loaded into or unloaded from a parking place and a remote driver who drives the first vehicle as a substitute through remote operation. According to the matching method, request information on substitution is transmitted from a terminal that is operated by a user of the first vehicle or a staff of a facility that offers the parking place to the user to a server connected to the terminal via a wireless communication network. Waiting time information indicating a waiting time until a timing when the first vehicle receives a remote operation service provided by the remote driver is transmitted from the server that has received the request information to the terminal. The user or the staff is notified of the waiting time information from the terminal. Approval of the waiting time information or payment instructions to pay an additional fee by the user or the staff is/are accepted at the terminal. A settlement of the additional fee is made through cooperation between the terminal and the server, when the terminal receives the payment instructions. The turn of the first vehicle in a queue for the remote operation service is changed by the server, such that the first vehicle is given higher priority than a second vehicle that has not paid the additional fee, upon completion of the settlement of the additional fee.

With the matching system or the matching method according to the present disclosure, when the user of the first vehicle pays the additional fee, the turn of the first vehicle in the queue for the remote operation service is changed such that the first vehicle is given higher priority than the second vehicle that has not paid the additional fee. In this manner, when it is desired to shorten the waiting time in loading or unloading the vehicle, the time needed to perform the matching between the vehicle and the remote driver can be shortened by paying the additional fee. Thus, the convenience of the valet parking service can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart showing a process performed by a server according to the second embodiment; and FIG. 6 is a flowchart showing a process performed by a vehicle ECU according to the third embodiment.

DETAILED DESCRIPTION OF EMBODIMENTS

In the case where numerals such as the number of pieces, numerical quantity, amount, range, and the like of each of elements are mentioned in the following embodiments, the technical concept according to the present disclosure is not limited to the mentioned numerals unless otherwise specified or unless the numerals should obviously be interpreted in a limiting manner in principle.

1. First Embodiment

1-1. Configuration Example of Matching System

Figure 1:
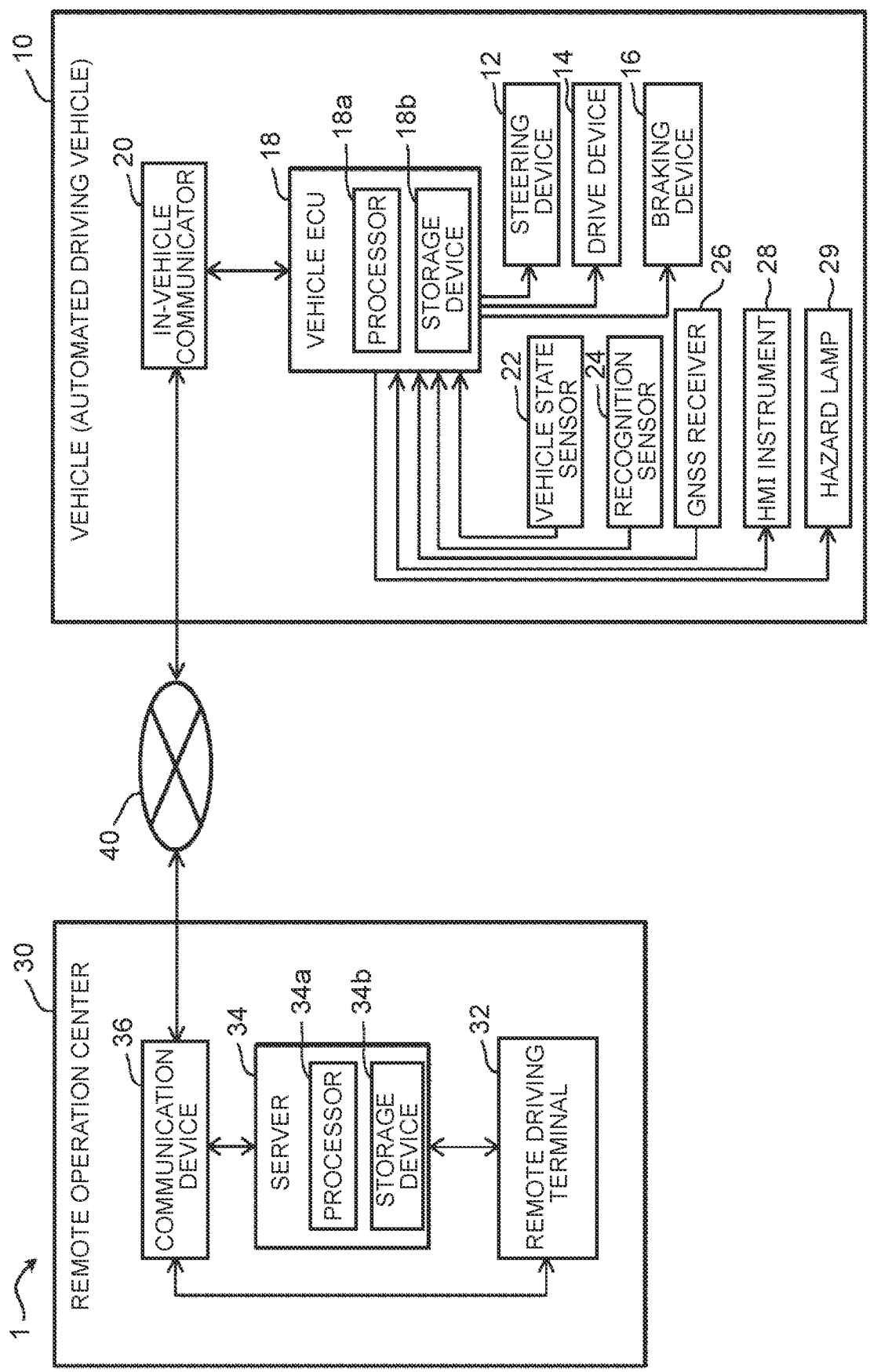
FIG. 1 is a block diagram showing a configuration example of a matching system according to the first embodiment.

FIG. 1 is a block diagram showing a configuration example of a matching system 1 according to the first embodiment. In FIG. 1, a vehicle 10 and a remote operation center 30 to which the matching system 1 is applied are depicted. Incidentally, although only the single vehicle 10 is depicted in FIG. 1, there is a plurality of vehicles 10 that are subject to remote driving by the remote operation center 30.

The vehicle 10 is configured to be remotely drivable by a remote driver who operates a remote driving terminal 32 that will be described later. Besides, the vehicle 10 is, for example, an automated driving vehicle. In concrete terms, the vehicle 10 is equipped with a steering device 12, a drive device 14, a braking device 16, an in-vehicle electronic control unit (vehicle ECU) 18, an in-vehicle communicator 20, a vehicle state sensor 22, a recognition sensor 24, a global navigation satellite system (GNSS) receiver 26, a human machine interface (HMI) instrument 28, and a hazard lamp 29. Incidentally, the vehicle 10 is only required to be configured to be remotely drivable, and may not necessarily be configured to be drivable in an automated manner.

The steering device 12, the drive device 14, and the braking device 16 are all, for example, of a by-wire type, and steer, drive, and brake the vehicle 10 respectively. The steering device 12 is mechanically separated from, for example, a steering wheel, and is equipped with a motorized turning actuator that turns wheels. The drive device 14 is, for example, an electric motor or an internal combustion engine equipped with an electronically controlled throttle. The braking device 16 is, for example, an electronically controlled brake (ECB).

The vehicle ECU 18 is a computer that controls the vehicle 10. In concrete terms, the vehicle ECU 18 is equipped with a processor 18a and a storage device 18b. The processor 18a performs various processes. The various processes include a process for controlling the running of the vehicle 10 based on information from the remote operation center 30, and a process for automated driving control. The storage device 18b stores various pieces of information. A volatile memory, a non-volatile memory, a hard disk drive (HDD), and a solid state drive (SSD) are presented as examples of the storage device 18b. The various processes performed by the vehicle ECU 18 are realized through execution of various computer programs by the vehicle ECU 18 (the processor 18a). The various programs are stored in the storage device 18b, or recorded in a computer-readable recording medium. Incidentally, there may be a plurality of processors 18a and a plurality of storage devices 18b.

The in-vehicle communicator 20 includes a processor, and communicates with the remote operation center 30 (a communication device 36 that will be described later) via a wireless communication network 40. The vehicle state sensor 22 detects a state of the vehicle 10. A vehicle speed sensor (wheel speed sensors), a steering angle sensor, a yaw rate sensor, and a lateral acceleration sensor are presented as examples of the vehicle state sensor 22. The recognition sensor 24 recognizes (detects) a situation around the vehicle 10. A camera, a laser imaging detection and ranging (LIDAR), and a radar are presented as examples of the recognition sensor 24. The GNSS receiver 26 acquires a position and an orientation of the vehicle 10 based on a signal from a GNSS satellite. A touch panel, a microphone, and a speaker are presented as examples of the HMI instrument 28.

The remote operation center 30 is equipped with a remote driving terminal 32, a server 34, and the communication device 36. The remote driving terminal 32 and the communication device 36 are connected to the server 34 via a wireless or wired communication network.

The remote driving terminal 32 is equipped with, for example, the steering wheel, an accelerator pedal, and a brake pedal, as remote operating instruments operated by an operator (the remote driver) for remote operation of the vehicle 10. Besides, the remote driving terminal 32 is equipped with a display for use in remote operation by the remote driver. The display displays an image around (at least in front of) the vehicle 10 imaged by the camera (the recognition sensor 24) of the vehicle 10.

The server 34 is a computer that performs a process regarding remote driving of the vehicle 10 by the remote driving terminal 32, and a process regarding a matching in the matching system 1. In concrete terms, the server 34 is equipped with a processor 34a and a storage device 34b. The processor 34a performs various processes. The storage device 34b stores various pieces of information. Concrete examples of the storage device 34b are identical to those of the storage device 18b. Various processes performed by the server 34 are realized through execution of various computer programs by the server 34 (the processor 34a). The various computer programs are stored in the storage device 34b, or recorded in a computer-readable recording medium. Incidentally, there may be a plurality of processors 34a and a plurality of storage devices 34b.

There may be a plurality of remote driving terminals 32 connected to the server 34. That is, the server 34 may have the function of managing the remote driving terminals 32.

The communication device 36 communicates with the vehicle 10 (the in-vehicle communicator 20) via the wireless communication network 40. In concrete terms, when the remote driving terminal 32 remotely operates the vehicle 10, the communication device 36 acquires information required for remote driving from the vehicle 10, such as information displayed on the display of the remote driving terminal 32, and transmits the information to the remote driving terminal 32 via the server 34. Besides, the communication device 36 acquires operation information on the operation of the vehicle 10 by the remote driver from the remote driving terminal 32 via the server 34, and transmits the operation information to the vehicle 10. Furthermore, the communication device 36 exchanges information on the matching in the matching system 1 with the in-vehicle communicator 20.

1-2. Matching Between Vehicle and Remote Driver

According to the configuration of the system shown in FIG. 1, remote driving of the vehicle 10 by the remote driver can be used for a valet parking service. More specifically, the user of the vehicle 10 moves toward a destination that is a facility (e.g., a hotel) having a parking place, through automated driving or manual driving by the user himself or herself. The user who has arrived at a stand-by position for valet parking (e.g., the entrance of the hotel) around the destination can ask the remote driver to load the vehicle 10 into the parking place as a substitute. Besides, the valet parking service that makes use of remote driving can be used not only when loading the vehicle 10 into the parking place but also when unloading the vehicle 10 from the parking place. That is, the user can ask the remote driver to unload the vehicle 10 from the parking place as a substitute.

The matching system 1 performs a matching between the vehicle 10 that requires substitution when being loaded into or unloaded from the parking place and the remote driver who drives the vehicle 10 as a substitute through remote operation. It should be noted herein that when it takes a long time to perform a matching between each of the vehicles and a remote driver at the time of loading or unloading because, for example, the number of vehicles 10 waiting for substitution is large, there is a problem of a deterioration in convenience of the valet parking service (i.e., a substitution service of loading or unloading).

Figure 2:
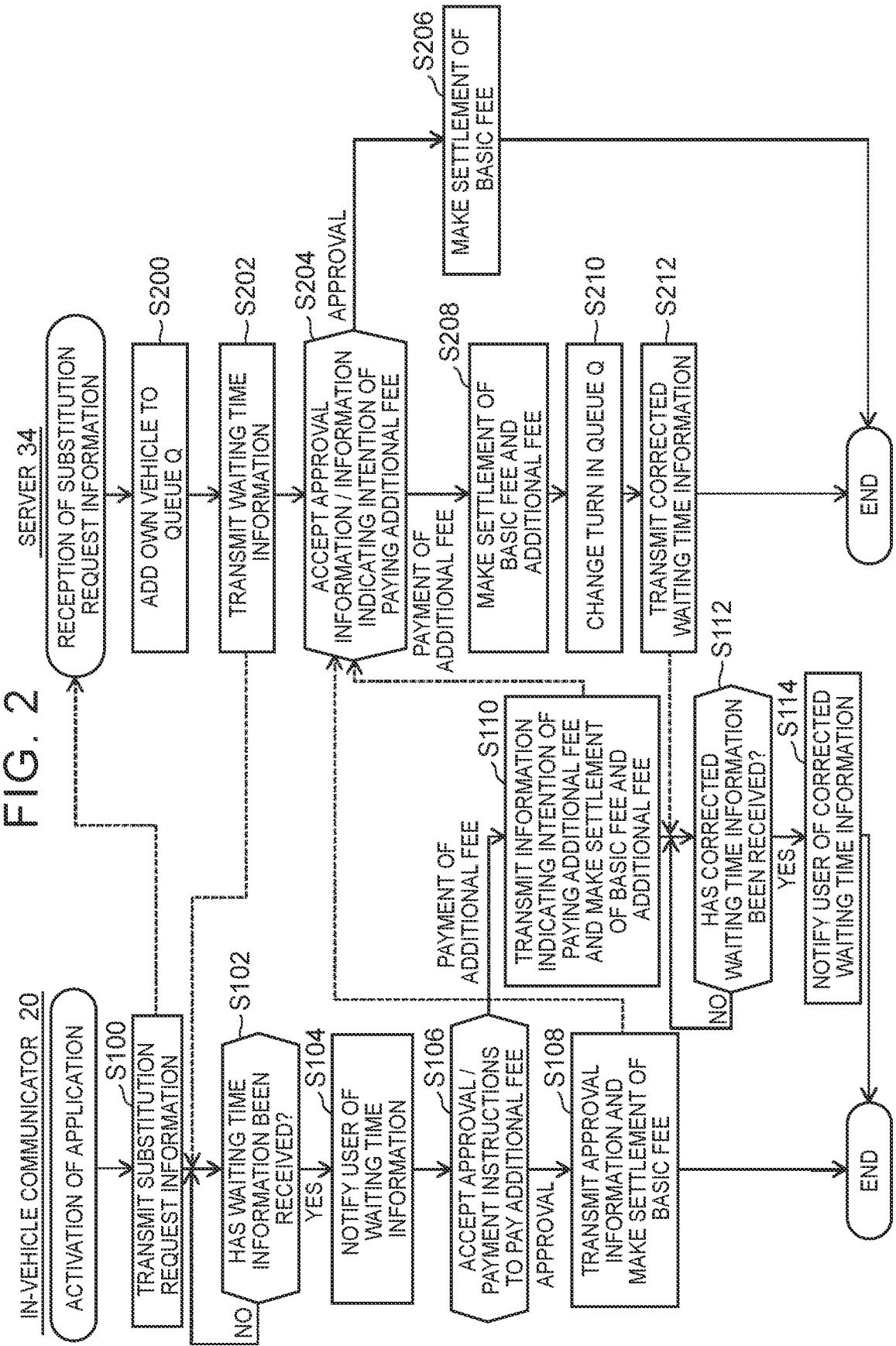
FIG. 2 is a flowchart showing the procedure of a matching method according to the first embodiment.

In consideration of the foregoing problem, the matching in the matching system 1 of the present embodiment is performed through the use of a matching method that will be described hereinafter. FIG. 2 is a flowchart showing the procedure of the matching method according to the first embodiment. This matching is performed through cooperation between the server 34 and the in-vehicle communicator 20. Incidentally, the in-vehicle communicator 20 corresponds to an example of "the terminal" according to the present disclosure. Besides, in the following description, the vehicle 10 that has been described as being subject to the process performed by the server 34 or the in-vehicle communicator 20 will also be referred to as "the own vehicle 10 (which is equivalent to "the first vehicle" according to the present disclosure)" as appropriate, so as to be distinguished from the other vehicles 10 that desire the matching.

In FIG. 2, the process in the in-vehicle communicator 20 is started when the user of the own vehicle 10 who desires the substitution service (the valet parking service) of loading or unloading by the remote driver activates a dedicated application.

Upon accepting a substitution request for loading or unloading from the user of the own vehicle 10 who uses the application, the in-vehicle communicator 20 transmits substitution request information to the server 34 in step S100. In concrete terms, for example, vehicle information needed to realize remote driving is registered in advance in the storage device 32b of the server 34, as to each of the vehicles 10 that desire to use the substitution service. The substitution request information in step S100 includes vehicle information on the own vehicle 10 that requests substitution this time as well as information indicating the substitution request.

The process in the server 34 (the processor 34a) is started when the server 34 receives the substitution request information from the in-vehicle communicator 20. The server 34 that has received the substitution request information adds the own vehicle 10 that has transmitted the substitution request information to the queue Q, in step S200.

The queue Q is a list of the vehicles 10 that desire remote operation performed by remote drivers. The queue Q may be designed exclusively for the substitution service (the valet parking service) of the present embodiment, or may also be available to, for example, vehicles that desire other remote driving services such as a taxi service. Besides, the queue Q is managed in principle according to the rules of First-In-First-Out (FIFO). Accordingly, in principle, the earlier a vehicle makes a request, the earlier the matching between the vehicle and a remote driver is completed.

Incidentally, in an example in which a plurality of remote drivers are assigned to the remote operation center 30, the queue Q may be created for each of the remote drivers, or the single queue Q may be shared by a plurality of remote drivers. In the example in which the queue Q is created for each of the remote drivers, the processing performed by the server 34 in step S200 includes a process of deciding a remote driver who takes charge of the assignment of remote driving of the own vehicle 10 that has made a substitution request this time, according to predetermined rules.

Figure 3A:
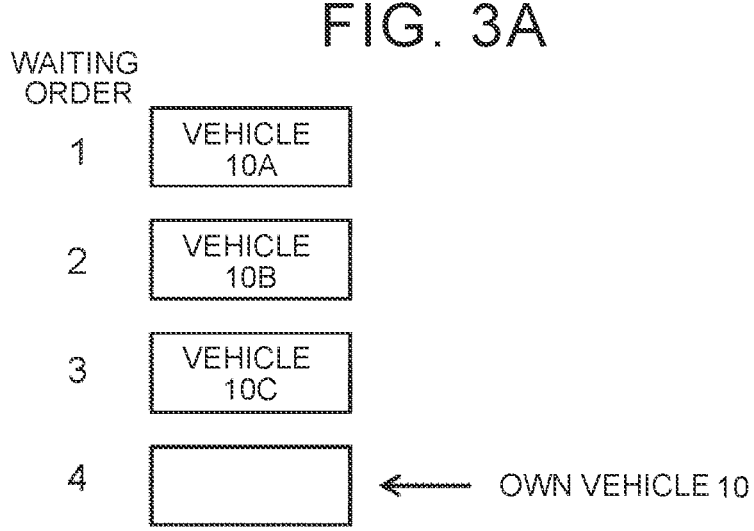
FIG. 3A is a view representing an example of the changing of an order in a queue though a process of the flowchart shown in FIG. 2.
Figure 3B:
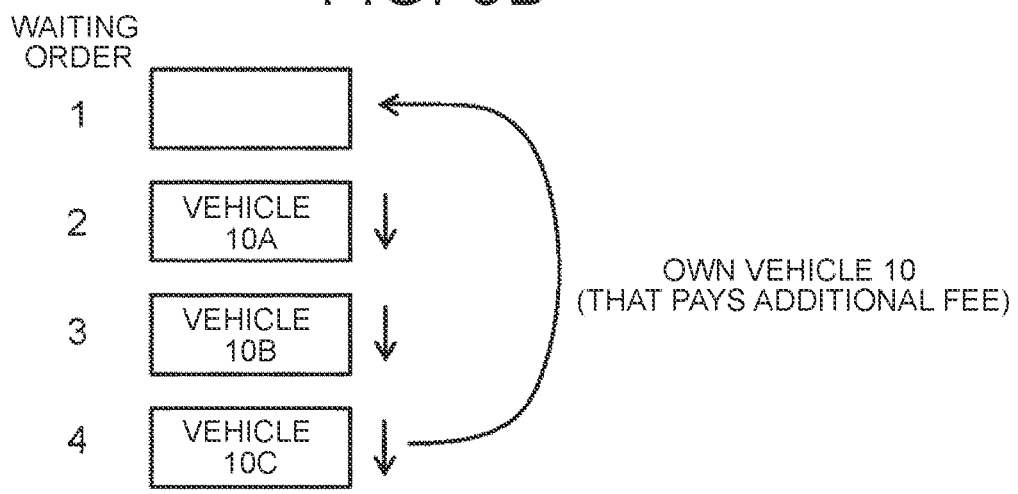
FIG. 3B is a view representing another example of the changing of the order in the queue through the process of the flowchart shown in FIG. 2.
Figure 3C:
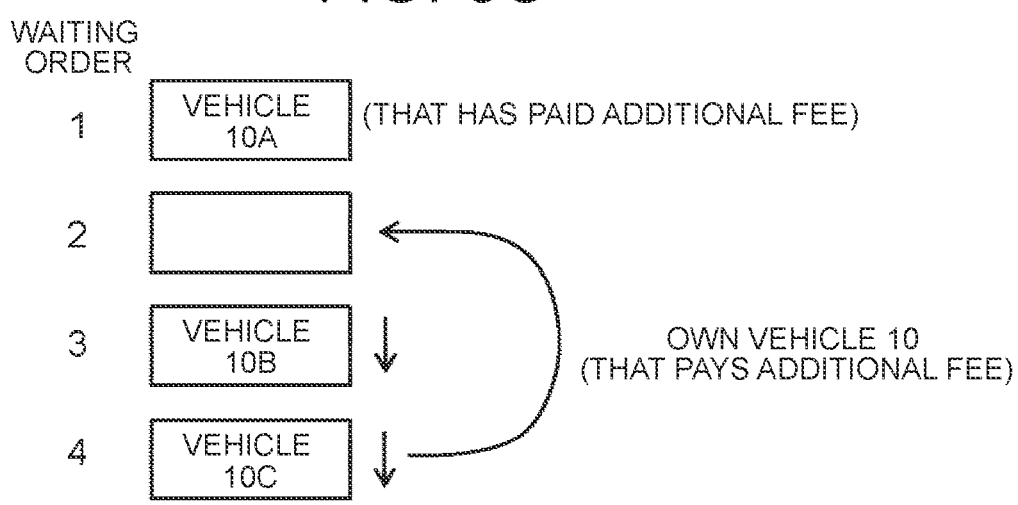
FIG. 3C is a view representing still another example of the changing of the order in the queue through the process of the flowchart shown in FIG. 2.

FIG. 3A is a view representing an example of the queue Q for use in the processing of step S200. In FIGS. 3A to 3C, three vehicles 10A, 10B, and 10C that have made a substitution request earlier than the own vehicle 10 are exemplified in addition to the own vehicle 10. Waiting priority is given to the three vehicles 10 in a descending order from the vehicle 10A to the vehicle 10B, and then to the vehicle 10C. According to the FIFO rules, in this example, the own vehicle 10 joins the queue Q after the vehicle 10C.

In step S202 following step S200, the server 34 transmits, to the in-vehicle communicator 20, waiting time information indicating a waiting time until a timing when the own vehicle 10 receives the substitution service provided by the remote driver. The waiting time information is, for example, information indicating the waiting turn itself of the own vehicle 10 as shown in FIG. 3A. Alternatively, for example, the server 34 may compute a waiting time of the own vehicle 10 based on the queue Q, and use the computed waiting time as waiting time information.

After receiving the waiting time information in step S102, the in-vehicle communicator 20 notifies the user of the own vehicle 10 of the waiting time information in step S104. The notification of the waiting time information may be given through the use of, for example, the HMI instrument 28 at least either by being displayed on the display or acoustically. After that, the process proceeds to step S106.

In step S106, the in-vehicle communicator 20 accepts approval of the waiting time information of which the user has been notified in step S104, or payment instructions to pay an additional fee, from the user. The additional fee is, for example, a fixed fee.

Upon receiving the user's approval in step S106, the in-vehicle communicator 20 transmits approval information to the server 34, and makes a settlement of a basic fee through cooperation with the server 34, in step S108. Upon completion of the processing of step S108, the process performed by the in-vehicle communicator 20 is ended.

On the other hand, upon receiving the payment instructions to pay the additional fee in step S106, the in-vehicle communicator 20 transmits information indicating an intention of paying the additional fee to the server 34, and makes a settlement of the basic fee and the additional fee through cooperation with the server 34, in step S110.

The server 34 accepts the approval information or the information indicating the intention of paying the additional fee in step S204. As a result, upon receiving the approval information from the in-vehicle communicator 20, the server 34 makes a settlement of the basic fee through cooperation with the in-vehicle communicator 20, in step S206. After that, the process performed by the server 34 is ended.

Besides, upon receiving the information indicating the intention of paying the additional fee from the in-vehicle communicator 20 in step S206, the server 34 makes a settlement of the basic fee and the additional fee through cooperation with the in-vehicle communicator 20, in step S208. After that, the process proceeds to step S210.

In step S210, the server 34 changes the turn of the own vehicle 10 in the queue Q such that the own vehicle 10 that has paid the additional fee is given higher priority than any vehicle that has not paid the additional fee (which is equivalent to "the second vehicle" according to the present disclosure).

FIG. 3B is a view representing a concrete example 1 of the processing of step S210. The concrete example 1 corresponds to an example in which none of the three vehicles 10A, 10B, and 10C that have made a substitution request earlier than the own vehicle 10 has paid the additional fee. In the concrete example 1, the server 34 changes the turn of the own vehicle 10 such that the own vehicle 10, which is the only vehicle that has paid the additional fee, moves to the head of the queue Q. As a result, the turns of the vehicles 10A. 10B, and 10C in the waiting queue decrease by one respectively. Incidentally, in the case where the queue Q is also available to other remote operation services such as the taxi service, the server 34 may change the turn of the own vehicle 10 such that the own vehicle 10 is given higher priority than vehicles waiting to receive other remote operation services as well as the vehicles 10A to 10C.

FIG. 3C is a view representing a concrete example 2 of the processing of step S210. The concrete example 2 corresponds to an example in which only the vehicle 10A has paid the additional fee among the vehicles 10A, 10B, and 10C. In the concrete example 2, the server 34 changes the turn of the own vehicle 10 such that the own vehicle 10 moves right behind the vehicle 10A that has paid the additional fee earlier than the own vehicle 10. As a result, the turns of the vehicles 10B and 10C that have not paid the additional fee in the waiting queue decrease by one respectively. In addition, in still another example in which the vehicle 10B as well as the vehicle 10A has paid the additional fee, the server 34 changes the turns of the own vehicle 10 and the vehicle 10C such that the own vehicle 10 moves right behind the vehicle 10B.

In step S212 following step S210, the server 34 transmits, to the in-vehicle communicator 20, corrected waiting time information indicating the waiting time that has been shortened as a result of the payment of the additional fee. After that, the process performed by the server 34 is ended.

After receiving the corrected waiting time information in step S112 following step S110, the in-vehicle communicator 20 notifies the user of the corrected waiting time information that has been received, through the use of the HMI instrument 28 in step S114. Thus, the user can grasp the waiting time after the payment of the additional fee. After that, the process performed by the in-vehicle communicator 20 is ended.

1-3. Effect

According to the matching system 1 described above, when the user of the own vehicle 10 pays the additional fee to the remote operation center 30, the turn of the own vehicle 10 in the queue Q for the remote operation service is changed such that the own vehicle 10 is given higher priority than any vehicle that has not paid the additional fee. In this manner, when it is desired to shorten the waiting time in loading or unloading the vehicle 10, the time required for the matching between the vehicle 10 and a remote driver can be shortened through the payment of the additional fee. Thus, the convenience of the substitution service (the valet parking service) can be enhanced.

1-4. Modification Example

In the first embodiment, the in-vehicle communicator 20 has been described as an example of "the terminal" according to the present disclosure. However, "the terminal" may be a portable terminal such as a smartphone possessed by the user of the vehicle 10.

Figure 4:
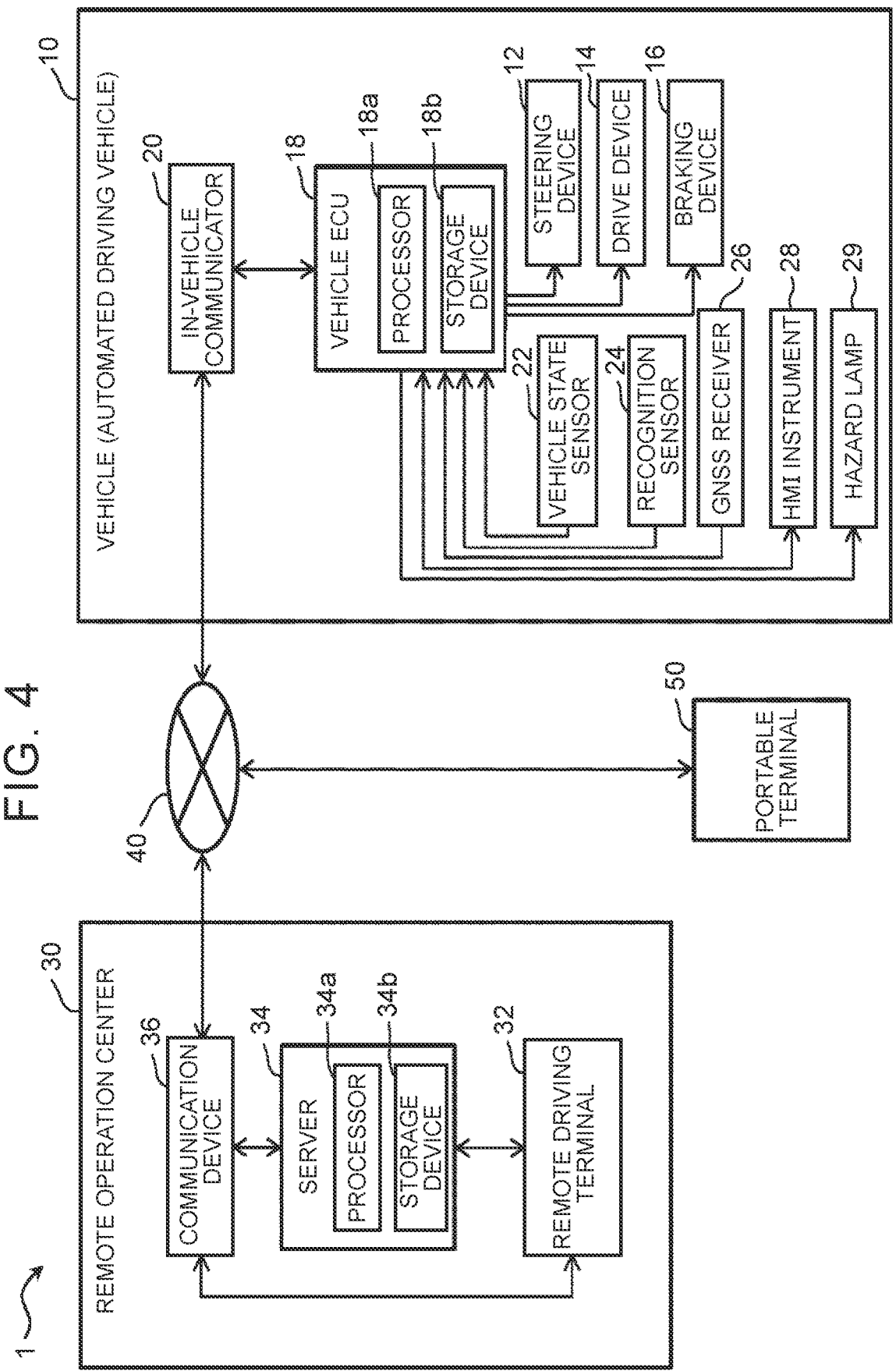
FIG. 4 is a block diagram showing a configuration example of a matching system according to a modification example of the first embodiment.

FIG. 4 is a block diagram showing a configuration example of a matching system 2 according to a modification example of the first embodiment. The matching system 2 is different from the matching system 1 shown in FIG. 1 in being additionally equipped with a portable terminal 50. In concrete terms, the portable terminal 50 includes a processor, and is connected to the remote operation center 30 and the vehicle 10 via the wireless communication network 40.

The portable terminal 50 is possessed by, for example, the user of the vehicle 10. The user who has arrived at a stand-by position for valet parking may request the server 34 for a substitution service by operating the portable terminal 50 instead of the in-vehicle communicator 20. That is, the portable terminal 50 performs the same process as the in-vehicle communicator 20 described in the first embodiment, as to the matching. Through the use of the portable terminal 50, the user can make a request for the substitution service after getting off the vehicle 10. It should be noted, however, that when the portable terminal 50 is used, the server 34 requires the portable terminal 50 and the vehicle 10 to be linked with each other, so as to identify the vehicle 10 that will receive the substitution service. Therefore, for example, information needed to identify the vehicle 10 from information on the portable terminal 50 that establishes communication for the matching may be registered in advance in a database with which the storage device 32b of the server 34 is equipped.

Besides, instead of the user of the vehicle 10, a staff of a facility (e.g., a hotel) that offers a parking place to the user may ask a remote driver to load or unload the vehicle 10 as a substitute. Therefore, the portable terminal 50 shown in FIG. 4 may be possessed not by the user of the vehicle 10 but by the staff. According the example in which the staff operates the portable terminal 50 in this manner, the facility can offer a highly convenient valet parking service (a substitution service) with the use of the matching system 2, including the payment of an additional fee, to the user.

Furthermore, in the first embodiment, the example in which the additional fee that is paid to shorten the waiting time is a fixed fee has been described. However, the additional fee may not be fixed, but may be arbitrarily decided by the user or the staff. Moreover, in the case where there is a plurality of vehicles that have paid the additional fee in the queue Q, higher priority may be given to a high additional fee than to an early timing of making a request for the substitution service. That is, the turns of vehicles in the queue Q may be changed such that a vehicle that makes a request for the substitution service at a later timing and pays a higher additional fee is given higher priority than a vehicle that makes a request for the substitution service at an earlier timing and pays a lower additional fee.

2. Second Embodiment

The second embodiment is different from the first embodiment in that the server 34 additionally performs the following process shown in FIG. 5.

FIG. 5 is a flowchart showing the process performed by the server 34 according to the second embodiment. The process of this flowchart is started when the server 34 receives substitution request information from the in-vehicle communicator 20.

If it takes a long time to perform a matching, other vehicles form a queue behind the vehicle (own vehicle) 10, and the vehicle 10 may hinder the traffic. Thus in FIG. 5, the server 34 determines whether or not the vehicle 10 that stands by at a stand-by position for the matching may hinder the traffic, in step S300.

The determination in step S300 can be made by, for example, detecting vehicles around the vehicle 10 through the use of the camera included as the recognition sensor 24. Besides, this determination can also be made through the use of, for example, positional information on the respective vehicles that has been shared via communication between the vehicle 10 and the vehicles around the vehicle 10.

When the vehicle 10 is unlikely to hinder the traffic in step S300, the process of the flowchart shown in FIG. 5 is ended. In this case, the process for the matching in accordance with the flowchart shown in FIG. 2 is continued.

On the other hand, when the vehicle 10 may hinder the traffic in step S300, the following processing of steps S302 and S304 is performed instead of the process of the flowchart shown in FIG. 2.

In step S302, the server 34 transmits, to the in-vehicle communicator 20, automatic charging of an additional fee for the sake of a swift matching between the vehicle 10 and a remote driver. In the example in which the portable terminal 50 is provided, the server 34 may transmit automatic charging of the additional fee to the portable terminal 50.

In step S304 following step S302, the server 34 changes the turn of the own vehicle 10 in the queue Q such that the vehicle (own vehicle) 10 is given higher priority than any vehicle that has not paid the additional fee.

According to the process of the flowchart shown in FIG. 5 that has been described above, when the vehicle 10 that stands by for the matching may hinder the traffic, the server 34 automatically charges the additional fee, regardless of whether or not the user of the vehicle 10 intends to pay the additional fee. As a result, the waiting time for the matching is shortened, and the vehicle 10 can be moved swiftly. Therefore, the valet parking service with the use of remote driving can be offered while restraining the vehicle 10 that stands by for the matching from hindering the traffic.

3. Third Embodiment

The third embodiment is different from the first embodiment in that the vehicle ECU 18 additionally performs the following process shown in FIG. 6.

FIG. 6 is a flowchart showing the process performed by the vehicle ECU 18 according to the third embodiment. The process of this flowchart is started when the in-vehicle communicator 20 transmits substitution request information in step S100 of the aforementioned flowchart shown in FIG. 2.

In FIG. 6, the vehicle ECU 18 (the processor 18a) determines whether or not a predetermined time T has elapsed from the transmission of substitution request information by the in-vehicle communicator 20 (the terminal) in step S400. The predetermined time T corresponds to, for example, a standard time that is assumed to be required from the transmission of substitution request information to the start of remote operation by the remote driver. As a result, if the predetermined time T has elapsed, the process proceeds to step S402.

In step S402, the vehicle ECU 18 determines whether or not remote operation of the vehicle (own vehicle) 10 by the remote driver has been started. It can be determined whether or not remote operation has been started, based on, for example, a result of transmission and reception of signals for remote operation between the server 34 and the vehicle ECU 18. As a result, if remote operation has been started, the current process of the flowchart is ended.

On the other hand, if remote operation has not been started even after the lapse of the predetermined time T in step S402, the process proceeds to step S404. In step S404, the vehicle ECU 18 performs automated driving control such that the own vehicle 10 leaves a stand-by position and stops on a road shoulder. Besides, the vehicle ECU 18 blinks the hazard lamp 29.

According to the process of the flowchart shown in FIG. 6 that has been described above, when it takes a long time to start remote operation by the remote driver with respect to the predetermined time T that is an assumed standard time, the vehicle 10 can be restrained from hindering the traffic through the use of automated driving control of the vehicle 10.

What is claimed is:

1. A matching system that performs a matching between a first vehicle that requires substitution when being at least either loaded into or unloaded from a parking place and a remote driver who drives the first vehicle as a substitute through remote operation, the matching system comprising:
a terminal that is operated by a user of the first vehicle or a staff of a facility that offers the parking place to the user; and
a server connected to the terminal via a wireless communication network, wherein
the terminal transmits request information on the substitution to the server,
the server that has received the request information transmits, to the terminal, waiting time information indicating a waiting time until a timing when the first vehicle receives a remote operation service provided by the remote driver,
the terminal notifies the user or the staff of the received waiting time information, and accepts approval of the waiting time information or payment instructions to pay an additional fee by the user or the staff,
the terminal makes a settlement of the additional fee through cooperation with the server, upon receiving the payment instructions, and
the server changes a turn of the first vehicle in a queue for the remote operation service such that the first vehicle is given higher priority than a second vehicle that has not paid the additional fee, upon completing the settlement of the additional fee.

2. The matching system according to claim 1, wherein the server transmits automatic charging of the additional fee to the terminal, and changes the turn of the first vehicle in the queue such that the first vehicle is given higher priority than the second vehicle that has not paid the additional fee, when there is a possibility of a traffic being hindered by the first vehicle that stands by for the matching.

3. The matching system according to claim 1, wherein the server transmits, to the terminal, corrected waiting time information indicating the waiting time that has been shortened as a result of payment of the additional fee, upon completing the settlement of the additional fee.

4. The matching system according to claim 1, wherein the first vehicle is an automated driving vehicle including an electronic control unit that performs automated driving control, and
the electronic control unit performs the automated driving control such that the first vehicle stops on a road shoulder, when remote operation of the first vehicle by the remote driver is not started even after lapse of a predetermined time from transmission of the request information by the terminal.

5. A matching method for performing a matching between a first vehicle that requires substitution when being at least either loaded into or unloaded from a parking place and a remote driver who drives the first vehicle as a substitute through remote operation, the matching method comprising:
transmitting request information on the substitution from a terminal that is operated by a user of the first vehicle or a staff of a facility that offers the parking place to the user to a server connected to the terminal via a wireless communication network;
transmitting waiting time information indicating a waiting time until a timing when the first vehicle receives a remote operation service provided by the remote driver, from the server that has received the request information to the terminal;
notifying the user or the staff of the waiting time information from the terminal;
accepting approval of the waiting time information or payment instructions to pay an additional fee by the user or the staff, at the terminal;
making a settlement of the additional fee through cooperation between the terminal and the server, when the terminal receives the payment instructions; and
causing the server to change a turn of the first vehicle in a queue for the remote operation service such that the first vehicle is given higher priority than a second vehicle that has not paid the additional fee, upon completion of the settlement of the additional fee.

6. The matching method according to claim 5, further comprising:
transmitting automatic charging of the additional fee from the server to the terminal; and
causing the server to change the turn of the first vehicle in the queue such that the first vehicle is given higher priority than the second vehicle that has not paid the additional fee,
when there is a possibility of a traffic being hindered by the first vehicle that stands by for the matching.

7. The matching method according to claim 5, further comprising:
transmitting corrected waiting time information indicating the waiting time that has been shortened as a result of payment of the additional fee from the server to the terminal, upon completion of the settlement of the additional fee.

8. The matching method according to claim 5, wherein the first vehicle is an automated driving vehicle including an electronic control unit that performs automated driving control,
the matching method further comprising:
causing the electronic control unit to perform the automated driving control such that the first vehicle stops on a road shoulder, when remote operation of the first vehicle by the remote driver is not started even after lapse of a predetermined time from transmission of the request information by the terminal.

* * * * *